United States Patent Office 3,551,438
Patented Dec. 29, 1970

3,551,438
**HYDROXY-PHENYL-ACETIC ACID-
$\Delta^3$-PIPERIDEIDE**
Hermann Oediger, Cologne-Stammheim, and Anton Oberdorf, Wuppertal-Elberfeld, Germany, assignors to Farbenfabriken Bayer Aktiengesellschaft, Leverkusen, Germany, a corporation of Germany
No Drawing. Filed June 30, 1967, Ser. No. 650,213
Claims priority, application Germany, Aug. 5, 1966,
F 49,878
Int. Cl. C07d 29/38
U.S. Cl. 260—297                                                 4 Claims

ABSTRACT OF THE DISCLOSURE

Homogentisic acid lactone or other 5-ring member aromatic lactone is reacted with an alkyl or dialkyl or other selected amine to produce homogentisic acid or other said amides having strong and long acting choleretic activity with low toxicity when administered orally. Representative compounds are homogentisic acid morpholide, pyrrolidide, 4-methyl-$\Delta^3$-piperideide, diethylamide and allylamide and o-hydroxy-phenylacetic acid-(4-methyl-$\Delta^3$-piperideide).

It is known to react o-hydroxy-phenylacetic acid lactone and ammonia to form o-hydroxy-phenylacetic acid amide [Liebigs Ann. Chem., vol. 313, 1900, p. 79]. Ethylene diamine [Annalen, 415 (1918), p. 26] and aniline [Annalen, 313 (1900), p. 79] can be reacted in the same manner.

The present invention relates to novel acid amides of aromatic lactones and amines which are useful for their choleretic activity and which when administered orally have strong and long acting activity with low toxicity. The new compounds are made by reacting certain aromatic lactones such as homogentisic acid lactone, with certain specified amines to produce compounds of the formula:

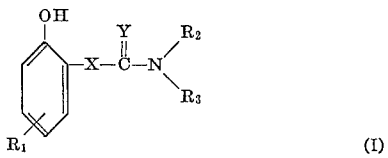

wherein
$R_1$ is hydrogen or one or more hydroxyl groups,
$R_2$ is alkyl, alkenyl or methylene-carboxylic acid alkyl ester,
$R_3$ is hydrogen or identical with $R_2$,
$R_2$ and $R_3$ together with the nitrogen atom form a heterocyclic ring,
X is —$CH_2$— or sulphur,
Y is oxygen when X is —$CH_2$— and is sulphur when X is sulphur.

The new compounds of the invention exhibit a strong chloretic activity and are generally superior to known choleretics with regard to the extent and duration of their effect. The compounds have a surprisingly low acute toxicity when administered orally. They are used in the same general manner and amounts as known choleretics.

The new acid amides are obtained by reacting an aromatic lactone of the formula:

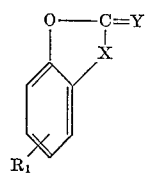

in which $R_1$ is hydrogen or one or more hydroxyl groups, X is —$CH_2$— or sulphur and Y is oxygen when X is —$CH_2$— and is sulphur when X is sulphur, with an amine of the formula:

in which $R_2$ is an alkyl group, alkenyl group or methylene-carboxylic acid alkyl ester group and $R_3$ is hydrogen or is identical with $R_2$, or $R_2$ and $R_3$ together with the nitrogen atom form a heterocyclic ring, in the presence of a solvent and isolating from the reaction mixture compounds of the Formula I.

Suitable lactones are aromatic 5-ring member lactones, for example, o-hydroxy-phenylacetic acid lactone, homogentisic acid lactone, 5-hydroxy-2-thione-1,3-benzoxathiol, etc.

Suitable amines are, for example, morpholine, pyrrolidine, piperidine, 4-methyl-$\Delta^3$-piperideine, piperidine-4-carboxylic acid methyl ester, diethylamine, aminoacetic acid methyl ester, allylamine, etc.

As solvents there may be used those solvents which are inert to the reaction components, for example, hydrocarbons such as cyclohexane and benzene; ethers such as diethyl ether or tetrahydrofuran; aliphatic esters such as ethyl acetate; tertiary bases such as pyridine; polar solvents such as acetonitrile or dimethylformamide. Mixtures of these solvents can also be used.

It is expedient to react one mol of lactone with 1.0 to 1.2 moles of the amine concerned. An excess of the amine is not detrimental in the case of sulphur-free lactones, but it should be avoided with sulphur-containing lactones, since the excess of amine can lead to strong secondary reactions.

The temperature to be applied for the reaction depends on the reactivity. It is comprised between —50 and +150° C., preferably between —20 and +100° C. The reactions are in general exothermic. The reaction time is from 15 minutes to 5 hours, dependent on the reaction components.

EXAMPLE 1

30.0 parts by weight of homogentistic acid lactone are dissovled in 80 parts by volume of dimethylformamide, a solution of 17.4 parts by weight of morpholine in 25 parts by volume of the same solvent is poured in whereupon strong spontaneous heating occurs, and the mixture is stirred at 100° C. for 15 minutes. The solvent is completely removed from the resultant reaction mixture by vacuum distillation and the crude product thus obtained is recrystallized from water. Yield: 85% of theory of homogentisic acid morpholide of M.P. 181–183° C.

EXAMPLE 2

30.0 parts by weight of homogentisic acid lactone are dissolved in 150 parts by volume of ethyl acetate, a solution of 17.0 parts by weight of pyrrolidine in 50 parts by volume of ethyl acetate is poured in at room temperature whereupon strong spontaneous heating occurs, and the mixture is heated under reflux for 30 minutes. After evaporation of the solvent, there are obtained 44 parts by weight of homogentistic acid pyrrolidide which can be purified by means of 50% aqueous alcohol. Yield: 87% of theory of homogentistic acid pyrrolidide of M.P. 195–197° C.

EXAMPLE 3

The procedure is the same as described in Example 2, but the pyrrolidine is replaced with 18.7 parts by weight of piperidine and the ethyl acetate is replaced with tetrahydrofuran. After purification of the crude product with 40% aqueous alcohol, there are thus obtained 40.0 parts by weight of homogentisic acid piperidide of M.P. 180–182° C.

EXAMPLE 4

The procedure is the same as described in Example 1, but the morpholine is replaced with 20 parts by weight of 4-methyl-$\Delta^3$-piperideine and the mixture is heated at 100° C. for 30 minutes. After purification of the crude product with ethanol, there are thus obtained 38.1 parts by weight (77%) of homogentisic acid-(4-methyl-$\Delta^3$-piperideide) of M.P. 187–189° C.

EXAMPLE 5

15 parts by weight of homogentisic acid lactone, 15 parts by weight of 4-carbomethoxy-piperidine and 100 parts by volume of tetrahydrofuran are heated under reflux for one hour, the solvent is removed in a vacuum and the residue recrystallized from ethyl acetate. Yield: 21 parts by weight of homogentisic acid-(4-carbomethoxy-piperidide) of M.P. 151–152° C.

EXAMPLE 6

26.8 parts by weight of o-hydroxy-phenylacetic acid lactone, 21.3 parts by weight of 4-methyl-$\Delta^3$-piperideine and 100 parts by volume of pyridine are stirred at 80° C. for 30 minutes. The solvent is removed in a vacuum and the crude product purified with a mixture of water and ethanol. Yield: 34 parts by weight (74%) of o-hydroxy-phenylacetic acid-(4-methyl-$\Delta^3$-piperideide) of M.P. 81–82° C.

EXAMPLE 7

18.4 parts by weight of 5-hydroxy-2-thione-1,3-benzoxathiol are dissolved in 80 parts by volume of tetrahydrofuran, a mixture of 9.7 parts by weight of 4-methyl-$\Delta^3$-piperideine and 20 parts by volume of the same solvent are slowly poured in at −50° C., the reaction mixture is stirred at 0° C. for 30 minutes and subsequently at room temperature for 30 minutes, then heated at 60° C. for 10 minutes and the solvent is removed in a vacuum. By purification with ether there are obtained 17 parts by weight of a compound of the formula:

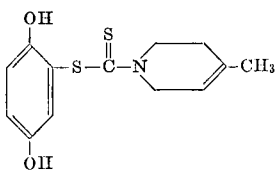

M.P. 144–146° C.

EXAMPLE 8

20 parts by weight of homogentisic acid lactone and 32 parts by weight of diethylamine are heated with 100 parts by volume of dimethylformamide under reflux for 11 hours. The solvent is removed in a vacuum and the reaction product recrystallized from a mixture of water and alcohol. Yield: 21 parts by weight of homogentisic acid-(diethylamide) of M.P. 132–133° C.

EXAMPLE 9

15 parts by weight of homogentisic acid lactone, 12.3 parts by weight of 1,4-diaza-bicyclo-(2,2,2)-octane, 13.2 parts by weight of aminoacetic acid methyl ester hydrochloride and 100 parts by volume of dimethylformamide are stirred at 100° C. for one hour. The precipitated hydrochloride of the initial tertiary amine is filtered off with suction, the solvent is removed from the solution in a vacuum and the residue is purified by chromatography through acidic aluminum oxide (activity stage II) in acetone. After triturating the reaction product in ether until solid, there are thus obtained 19 parts by weight of a compound of the formula:

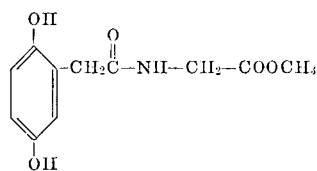

M.P. 103–104° C.

EXAMPLE 10

30 parts by weight of homogentisic acid lactone, 17 parts by weight of allylamine and 100 parts by volume of tetrahydrofuran are heated under reflux for 30 minutes. The solvent is removed in a vacuum, the reaction product is purified with ether and there are obtained 31 parts by weight of homogentisic acid allylamide of melting point 101–102° C.

EXAMPLE 11

30 parts by weight of homogentisic acid lactone, 40 parts by weight of diallylamine and 100 parts by volume of dimethylformamide stirred at 120 to 130° C. for 5 hours. The solvent is removed under vacuum and the crude product is purified by chromatography in neutral aluminum oxide (activity stage II) in acetone. After redissolving from 25% ethanol there is obtained 34 parts by weight of homogentisic acid-diallylamide of M.P. 91–93° C.

EXAMPLE 12

The procedure described in Example 11 is followed, except that the diallylamine is replaced by 28 parts by weight of n-heptylamine and the chromatographically purified homogentisic acid-n-heptylamide is crystallized from a water-ethanol mixture. Yield: 44 parts by weight, M.P. 91–92° C.

EXAMPLE 13

13.4 parts by weight of o-hydroxyphenylacetic acid lactone and 8.9 parts by weight of piperidine are heated under reflux for one hour in 30 parts by volume of tetrahydrofuran. The solvent is removed under vacuum and the obtained o-hydroxyphenylacetic acid piperidide is crystallized from 40% aqueous ethanol. Yield: 17 parts by weight, M.P. 99–101° C.

EXAMPLE 14

13.4 parts by weight of o-hydroxyphenylacetic acid lactone, 35 parts by volume of tetrahydrofuran and 11.7 parts by weight of 3,4-dimethyl-$\Delta^3$-piperideine are heated under reflux for one hour. The solvent is removed under vacuum and the obtained o-hydroxyphenylacetic acid-[3,4-dimethyl-$\Delta^3$-piperideide] is crystallized from acetic ester. Yield: 18 parts by weight, M.P. 97–99° C.

What is claimed is:

1. A compound of the formula

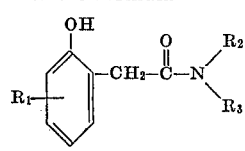

wherein $R_1$ is hydrogen or hydroxyl, and $R_2$ and $R_3$ together with the nitrogen atom are linked to form a 4-methyl-$\Delta^3$-piperideide ring or a 3,4-dimethyl-$\Delta^3$-piperideide ring.

2. The compound of claim 1 which is homogentisic acid-(4-methyl-$\Delta^3$-piperideide).

3. The compound of claim 1 which is o-hydroxy-phenylacetic acid-(4-methyl-$\Delta^3$-piperideide).

4. The compound of claim 1 which is o-hydroxyphenylacetic acid-[3,4-dimethyl-$\Delta^3$-piperideide].

References Cited
UNITED STATES PATENTS
3,030,372  4/1962  Janssen _____ 260—297

HENRY R. JILES, Primary Examiner
G. T. TODD, Assistant Examiner

U.S. Cl. XR.

260—247.7, 293.4, 294.7, 294.8, 455, 559; 424—248, 263, 267, 301, 324, 274, 308; 260—294.3, 326.5, 473